(12) United States Patent
Varma et al.

(10) Patent No.: US 9,019,673 B2
(45) Date of Patent: Apr. 28, 2015

(54) FAULT DETECTION AND SHORT CIRCUIT CURRENT MANAGEMENT TECHNIQUE FOR INVERTER BASED DISTRIBUTED GENERATORS (DG)

(71) Applicants: Rajiv Kumar Varma, London (CA); Shah Arifur Rahman, Sarnia (CA)

(72) Inventors: Rajiv Kumar Varma, London (CA); Shah Arifur Rahman, Sarnia (CA)

( * ) Notice: Subject to any disclaimer, the term of this patent is extended or adjusted under 35 U.S.C. 154(b) by 134 days.

(21) Appl. No.: 13/827,979

(22) Filed: Mar. 14, 2013

(65) Prior Publication Data

US 2014/0085763 A1 Mar. 27, 2014

Related U.S. Application Data

(60) Provisional application No. 61/706,387, filed on Sep. 27, 2012.

(51) Int. Cl.
| | |
|---|---|
| *H02H 3/00* | (2006.01) |
| *H02H 3/08* | (2006.01) |
| *H02H 7/122* | (2006.01) |
| *H02H 7/28* | (2006.01) |
| *H02H 7/20* | (2006.01) |

(52) U.S. Cl.
CPC ............. *H02H 3/08* (2013.01); *H02H 7/1227* (2013.01); *H02H 7/20* (2013.01); *H02H 7/28* (2013.01)

(58) Field of Classification Search
USPC .................................................... 361/62–69
See application file for complete search history.

(56) References Cited

U.S. PATENT DOCUMENTS

| 6,198,402 | B1 | 3/2001 | Hasegawa et al. | |
|---|---|---|---|---|
| 2009/0322083 | A1* | 12/2009 | Wagoner et al. | 290/44 |
| 2012/0026631 | A1* | 2/2012 | Kazemi et al. | 361/42 |

FOREIGN PATENT DOCUMENTS

WO 2009083640 A2 7/2009

OTHER PUBLICATIONS

International Searching Authority, "International Search Report and Written Opinion", International Application No. PCT/CA2013/050202, dated Jun. 21, 2013.

* cited by examiner

*Primary Examiner* — Danny Nguyen
(74) *Attorney, Agent, or Firm* — Brion Raffoul

(57) ABSTRACT

Systems, methods, and devices relating to fault detection and short circuit current management support in power transmission and distribution networks using multiple inverter based power generation facilities. A fault detection process uses the waveshape (or the rate of change of the current) of the distributed generator output short circuit current to determine if a trip signal is required to disconnect the inverter based power generation facility from the transmission and distribution network. The process operates on DGs such as photovoltaic (PV) based solar farm. The present invention applies to the entire 24-hour period operation of inverter based DGs (e.g., solar farms, wind farms, fuel cell based DGs, etc.).

7 Claims, 11 Drawing Sheets

FAULT DETECTION AND SHORT CIRCUIT CURRENT MANAGEMENT TECHNIQUE FOR INVERTER BASED DISTRIBUTED GENERATORS (DG)

FIELD OF THE INVENTION

The present invention relates to inverter based distributed power generation facilities. More specifically, the present invention relates to providing fault detection and short circuit current management control for inverter based distributed generators (DGs) in power transmission and distribution networks.

BACKGROUND OF THE INVENTION

Renewable energy based Distributed Generators (DGs), such as photovoltaic solar and wind generators, are receiving strong encouragement globally through various incentive programs. Solar farms and wind farms which generate power from few kW to several hundred MW are being installed in both distribution and transmission systems. Distributed generation power sources connected at one or more locations within the distribution system have brought new issues and problems to existing power systems.

One of the major obstacles in existing electric power systems is that the integration of more distributed generators (DGs) to the network increases the short circuit level significantly due to the contribution of the DG to the fault. In general all forms of DG contribute some increase to fault levels. The connection of DGs to the distribution network could therefore result in fault levels exceeding the design limit of the network, particularly if the network is already operating close to its design limit (i.e., with low fault level headroom). When fault level design limits are exceeded, there is a risk of damage to and failure of the equipment with consequent risk of injury to personnel and interruption of supply under short circuit fault conditions.

Faults (short circuits) are inevitable. Any power system is expected to suffer several faults each year. The number will depend on exposure to lightning and damage from trees, as well as the age of the system's components. When a short circuit fault occurs in the distribution network, a short circuit current will flow to the fault location. This short circuit current is detected and cleared by existing protection equipment, such as circuit breakers or fuses.

However, when fault levels go beyond the existing design limits due to the connection of DGs, uprating the capability of existing protection equipment such as circuit breakers is the only option to increase the fault level capabilities of the network. It is likely that a large area of the network must be reworked in such cases, making this an exorbitantly expensive solution, particularly if transformers and cables or overhead lines are also involved. Hence, utility companies are limiting the connection of DGs into their existing network, resulting in a loss of opportunity to integrate more renewable energy generation into the transmission and distribution grid system.

Even though inverter based DGs, such as PV solar farms, contribute far less short circuit current to the network compared to conventional synchronous generators, the short circuit contribution is nevertheless considered unacceptable by many utility companies as it may potentially damage their transformers and circuit breakers, especially if there are several DGs operating together.

Moreover, according to industry standards (e.g., IEEE-1547 or UL-1741) regardless of fault level, DGs are required to disconnect upon detection of fault on the system. Conventional fault detection techniques based on over-voltage, under-voltage and over-current signals, which are used to operate the protective circuit breakers and disconnect the DGs from the network, are fast but yet not adequate to meet the stringent requirement of utilities. Even a small contribution of short circuit current may unacceptably overload the circuit breakers. This means that the detection of faults and disconnection of DGs from the network should be done as quickly as possible.

In light of the above, there is a need for solutions which mitigate if not overcome the shortcomings of the prior art.

SUMMARY OF INVENTION

The present invention provides systems, methods, and devices relating to fault detection and short circuit current management support in power transmission and distribution networks using multiple inverter based power generation facilities. A fault detection process uses the wave-shape (the rate of change or the magnitude) of the short circuit current to determine if a trip signal is required to disconnect the inverter based power generation facility from the transmission and distribution network. The process operates on DGs such as photovoltaic (PV) based solar farm. The present invention applies to the entire 24-hour period operation of inverter based DGs (e.g., solar farms, wind farms, fuel cell based DGs, etc.).

In a first aspect, the present invention provides a method for determining if a short circuit has occurred on a power distribution and transmission network, the method comprising:
  a) determining a current reading at a point of common coupling where a distributed generator is coupled to said power distribution and transmission network;
  b) determining if at least one fault condition is satisfied based on said current reading;
  c) in the event said at least one fault condition is satisfied, disconnecting said distributed generator from said power distribution and transmission network;
wherein said method is executed at an inverter based distributed generator facility.

In a second aspect, the present invention provides computer readable media having encoded thereon computer executable instructions which, when executed, implements a method for determining if a short circuit has occurred on a power distribution and transmission network, the method comprising:
  a) determining a current reading at a point of common coupling where a distributed generator is coupled to said power distribution and transmission network;
  b) determining if at least one fault condition is satisfied based on said current reading;
  c) in the event at least one fault condition is satisfied, disconnecting said distributed generator from said power distribution and transmission network.

In a third aspect, the present invention provides a fault detector system for detecting short circuit faults at a point of common coupling where an inverter-based distributed generator couples to a power distribution and transmission network, the system comprising:
  a circuit element for receiving an output current reading from said point of common coupling;
  a rate limiter circuit element for determining if a rate of change of said output current reading is below a predetermined safe rate of change value;
  a comparator for comparing an output of said rate limiter with said predetermined safe rate of change value, said comparator generating a trip signal in the event said predetermined safe rate of change value is exceeded.

BRIEF DESCRIPTION OF THE DRAWINGS

The embodiments of the present invention will now be described by reference to the following figures, in which identical reference numerals in different figures indicate identical elements and in which.

Figure 1:
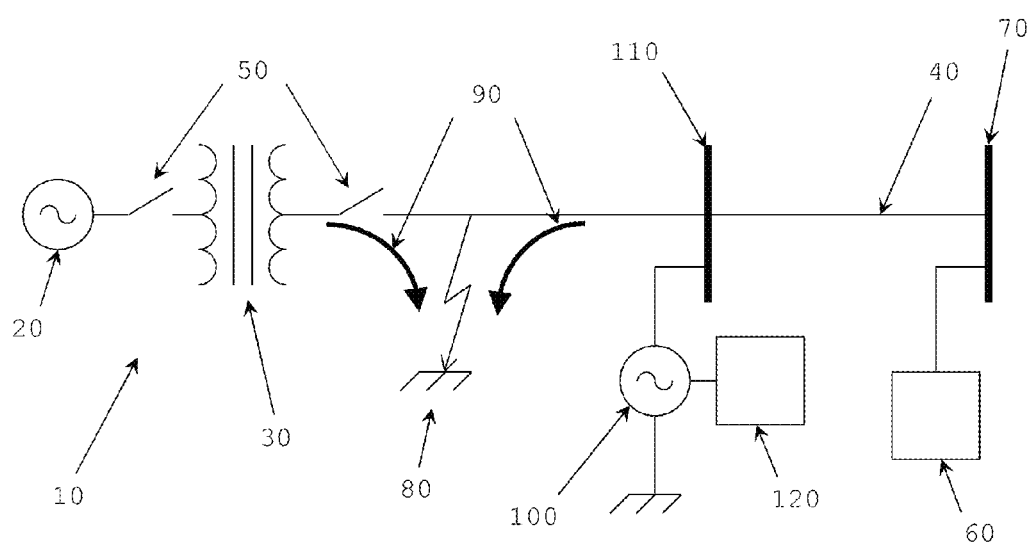
FIG. 1 shows a system block diagram of an embodiment of the present invention.

The figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention.

DETAILED DESCRIPTION OF THE INVENTION

The terms "coupled" and "connected", along with their derivatives, may be used herein. It should be understood that these terms are not intended as synonyms for each other. Rather, in particular embodiments, "connected" may be used to indicate that two or more elements are in direct physical or electrical contact with each other. "Coupled" may be used to indicate that two or more elements are in either direct or indirect (with other intervening elements between them) physical or electrical contact with each other, or that the two or more elements co-operate or interact with each other (e.g. as in a cause and effect relationship).

The disclosed embodiments herein are merely exemplary, and it should be understood that the invention may be embodied in many various and alternative forms. For purposes of teaching and not limitation, the illustrated embodiments are directed to a method of fault detection and short circuit current management in a DG system using a solar farm inverter or any other inverter based power generation facility.

The use of solar farm inverters and wind farm inverters is applicable regardless of the following:

Type and configuration of inverter, e.g., 6 pulse, 12 pulse, multilevel, etc;

Type of semiconductor switches used, e.g., gate turn-off thyristor (GTO), insulated gate bipolar transistor (IGBT), etc;

Type of firing methodology used, e.g., pulse width modulation (PWM), sinusoidal pulse width modulation (SPWM), hysteresis control, phase locked loop (PLL) based, etc;

Methodology of controller design, e.g., pole placement, lead lag control, genetic algorithm based control, etc;

Choice of auxiliary control signals, e.g., local signals such as line current magnitude, active power flow, local bus frequency, remote signals such as phasor measurement unit (PMU) acquired signals, etc.

The present invention seeks to provide systems, methods, and devices which provide a rapid solution for controlling and reducing the short circuit current from inverter based distributed generators, and which support the addition of distributed generators (solar, wind, etc.) and other conventional generators to the power system without requiring the expensive uprating of existing protection equipment.

The present document refers to a photovoltaic (PV) solar farm. However, the skilled artisan will understand that the present invention is not limited to this type of solar based power generation system, but can be used with any distributed power generation source where a voltage inverter is utilized.

The present invention relates to fault detection and short circuit current management of inverter based distributed generators. Through the inventive control, the inverter based distributed generators will disconnect the PV inverter permanently in response to short circuit fault in the network for a period of time while the fault is cleared. The time duration for which the inverter based DGs are disconnected will be determined by the amount of time required to clear the fault and the power conditions of the transmission and distribution network.

The present invention provides a rapid fault detection technique—the technique monitors the rate of rise of current and the current magnitude using an auxiliary fault detector controller. The auxiliary fault detector monitors the inverter current output to detect the fault and operates the IGBT switches to disconnect the PV inverter quickly before the rated output current of the inverter is exceeded. As a result, the quick disconnection of the DG is capable of preventing the rise of the short circuit current. This can alleviate the problem of fault level when more DGs are integrated to the network as mentioned earlier.

The present invention offers a less expensive solution to the issue of limiting short circuit currents from inverter based distributed generators, as no additional expensive equipment is required. Implementation of the fault detection and short circuit current management control in the DG inverters can create new opportunities for additional connection of distributed generators and other conventional generators that may have been previously denied permission to connect due to short circuit current limitations.

The present invention applies to the entire 24-hour period operation of inverter based DGs. These DGs may take the form of solar farms, wind farms, fuel cell based DGs, or any other inverter based distributed generators.

FIG. 1 is a single-line representative diagram of an exemplary system (10) in which the invention may be practiced. In a typical distribution network a power generation facility (20) through transformers (30) is coupled to a power transmission and distribution network (40). The power transmission and distribution network (40) is equipped with protection equipment such as circuit breakers (50). At the other end of the network (40) is a load (60) coupling to the load bus (70). For simplicity, the loads (60) on the system (40) are combined together, which may be a separate power system, or an industrial complex with a variety of devices that may include induction motors.

When a short circuit fault (80) occurs in the distribution network (40), a short circuit current (90) will flow to the fault location (80). Both existing power generators (20) and distributed generators, for example PV solar farm (100), will contribute to the short circuit current (90). The inverter based power generation facility (100) couples to the network (40) at the point of common coupling (110). The power generation facility (100) is equipped with existing power generation modules and a fault detection and short circuit current management auxiliary controller (120).

Figure 2:
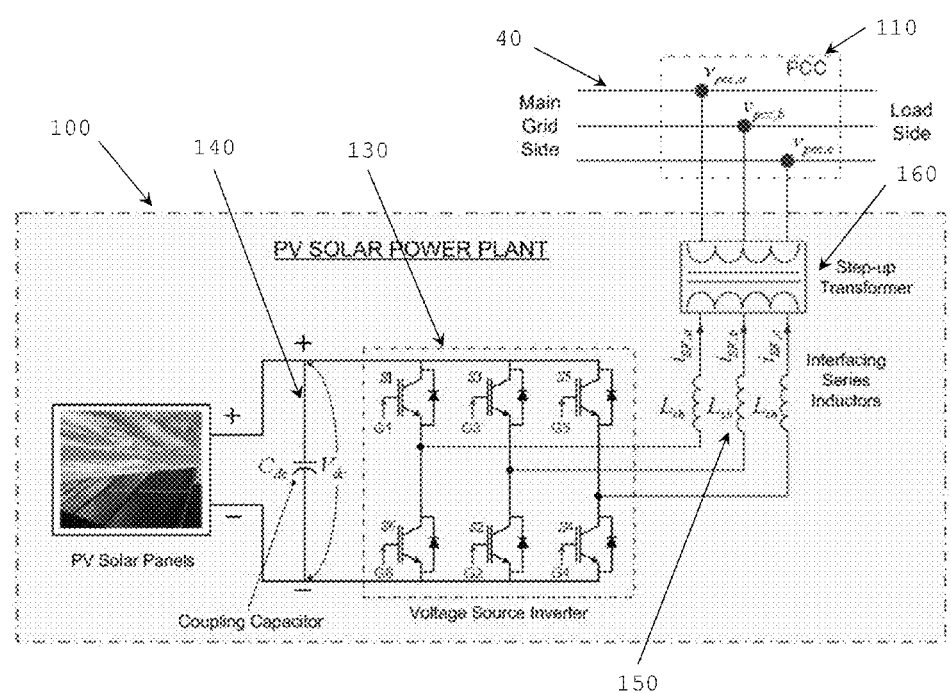
FIG. 2 shows a detailed PV solar farm schematic illustrating the features in conventional solar farm circuitry.

FIG. 2 is a detailed PV solar farm (100) schematic, using as a voltage sourced inverter (130) with a DC bus capacitor (140). The voltage sourced inverter (130) is realized by utilizing six semiconductor switches (here, IGBTs). It may be understood that there are several types/configurations of voltage sourced converters/inverters. However, the invention applies to any type/configuration of the inverter. The inverter (130) is connected to the network (40) through interfacing series inductors (150) and a step-up transformer (160). The point at which the PV solar farm is connected to the power transmission network (40) is termed as the point of common coupling (110). The currents injected/delivered by the PV solar farm (100) are denoted as $i_{SF,a}$, $i_{SF,b}$ and $i_{SF,c}$.

Figure 3:
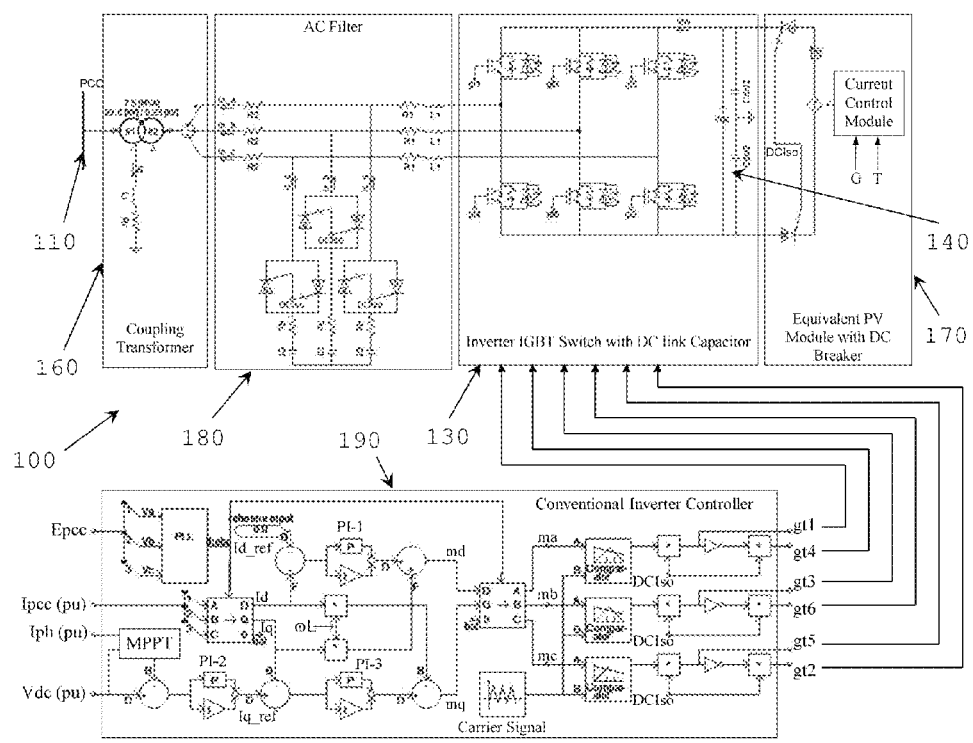
FIG. 3 shows a circuit diagram illustrating the circuitry of a PV solar farm.

Referring to FIG. 3, a block diagram of a PV solar farm circuitry according to one aspect of the invention is illustrated. The PV solar system (100) is comprised of PV modules (170) that generate direct current (DC) power from the solar irradiation, which is converted into alternating current (AC) power with the help of inverter (130). The AC filter (180) at the output of the inverter (130) maintains the power quality whereas the DC link capacitor (140) maintains the DC voltage on the DC side of the inverter (130).

The inverter (130) is a voltage sourced converter that is comprised of IGBT switches and associated snubber circuits. Each phase (a, b and c) has a pair of IGBT devices that converts the DC voltage into a series of variable width pulsating voltages, using the sinusoidal pulse width modulation (SPWM) technique. The gating signals (gt1, gt2, gt3, gt4, gt5, gt6) of the IGBT switches are generated from a conventional inverter controller (190). The conventional inverter controller (190) uses two current control loops to control the active and reactive power at the inverter output. The controller 190 also deals with the regulation of DC link voltage by taking three phase current signals from the inverter output as feedback signals to the controller.

The conventional PV solar farm only controls the reactive power output of the inverter such that it can perform unity power factor operation along with the DC link voltage control. The switching signals for the inverter (130) switching are generated through two current control loops as noted above. The upper current control loop regulates the reactive power. $Q_{ref}$ is only proportional to $I_d$ which sets the reference $I_{d\_ref}$ for the upper control loop. On the other hand, the lower current control loop regulates the DC link voltage through two proportional-integral (PI) controllers (PI-2 and PI-3) according to the set point voltage provided by the maximum power point tracking (MPPT), as well as injects all the available real power to the network (40). To generate the proper IGBT switching signals (gt1, gt2, gt3, gt4, gt5, gt6), the direct-quadrature components (md and mq) of the modulating signal are converted into three phase sinusoidal modulating signals and compared with a high frequency fixed magnitude triangular wave or carrier signal.

FIG. 4(a) shows a block diagram of the auxiliary fault detection and short circuit current management controller (referred to hereafter as the fault detector) according to one aspect of the present invention. FIG. 4(a) is provided to illustrate the concept of the fault detector.

The fault detector (200) has three separate channels to measure three phase instantaneous inverter output currents ($I_{0\_a}$, $I_{0\_b}$, $I_{0\_c}$) at the PCC. These channels help detecting both symmetrical and asymmetrical faults such as for example, single line to ground fault, two lines to ground fault, etc. For each one of the three channels, the phase instantaneous inverter output currents are passed through a low pass filter (270) to reject all the higher order frequencies due to solar inverter injection, feeder capacitor switching or transformer energization. The filtered current is passed through two parallel paths in each channel—one path is through a slope detector (d/dt) (265) and the other path is through a magnitude detector |I| (295). The slope detector (265) is comprised of a comparator which compares the derivative of the PV system current (to determine the slope) and compares this slope with the reference slope (d/dt)max.

Similarly, the magnitude detector (295) is comprised of a comparator which compares the magnitude of the PV system current (|I|) with a reference value |I|max, the peak magnitude of instantaneous rated current. The output of these detectors goes high only if either of the monitored values, (d/dt) or |I| exceeds their corresponding reference values, (d/dt)max or |I|max. The outputs of the detectors referred here as 'trigger signals' are passed through an OR gate (298). The OR gate output signal is then applied to the RS flip-flop (300) to hold the trigger signal once it goes high. It is noted that during a transient event (such as the load switching, transformer energization, capacitor switching etc.), if a current transient is not completely filtered out in the low pass filter (270), it can cause a high d/dt for a very short period of time. This high d/dt may generate an undesirable trigger signal leading to a shutdown of the PV solar system. To avoid this situation, a time delay (310) in the clock signal of the RS flip-flop (300) is introduced. The time delay prevents the above-described spurious trigger signals (generated due to a transient) from passing through the RS flip-flop.

Finally, the triggering signals from all the channels are passed through a digital 'OR' gate (315) to ensure that the output triggering signal, 'PVIso', becomes high whenever a fault is detected with any of the phase signals. Alternatively 'DCIso' (320) becomes low due to the detection of a fault with any of the phase signals. Of course, the NOT gate at end of the circuit which produces the DCIso signal is optional and depends on whether the receiving circuit operates on a positive or negative logic.

FIG. 4(b) shows one implementation of the above fault detector on a commercially available electromagnetic transients simulation software PSCAD®/EMTDC™. The implementation is provided only as an example. Similar implementations are also possible using other similar commercially available software packages.

FIG. 4(b) is divided in two sections: Section-A (210) and Section-B (220). There are three identical channels corresponding to the phase a ($I_{0\_a}$), phase b ($I_{0\_b}$), and phase c ($I_{0\_c}$) currents. The channel corresponding to phase a is described in detail below.

The fault detector uses a synchronization section labeled as Section-A (210). In this section the current signals, $I_{0\_a}$, monitored at the PCC as explained earlier is passed through a low pass filter (270). To avoid false operation of the fault detection module due to a start up transient of the solar farm, a time delay (typically 1 sec) is added through a comparator (230). The output of the comparator becomes high after this preset time delay of 1 sec.

It is preferred that a zero crossing synchronization be performed prior to transmitting the filtered current signal to the input of section-B (220). This synchronization ensures that the section-B operation will start only from the zero crossing instants of the current $I_{o\_a}$. If the zero crossing synchronization is not performed, the slope detector (265) in section-B will see a sudden jump in current or, alternatively, a high rate of rise of current, both of which will generate a false triggering signal. To synchronize with the zero crossing of current, a D flip-flop (250) is used at the output of the comparator (230). The clock signal of the D flip-flop (250) is twice the fundamental frequency. The clock signal to the D flip-flop is implemented through a zero crossing detector (240) of the input signal $I_{o\_a}$. The clock frequency is twice that of fundamental frequency so that the synchronization can occur at either of the two positive going or negative going zero crossings. When the comparator (230) output becomes high after 1 sec, the output of the D flip-flop (250) waits for the zero crossing of the current signal $I_{o\_a}$. Until this time the output of the D flip-flop remains zero and no current signal passes to section B. Once the synchronization with zero crossing is accomplished, the current signal from section-A is transmitted to Section-B.

The synchronized signals from Section-A are passed through two parallel paths in section-B in each channel as explained above. In the EMTDC™/PSCAD© software, the first rate limiter (260) replicates the input signal as long as the rate of change of the input (d/dt) does not exceed the specified threshold limit indicated by 'Ref Rate'. Therefore, the output of the rate limiters is based on the slope of the input signal. During a system fault, the rate of change of the input current (d/dt) becomes more than the threshold limit.

The threshold limit can be determined approximately with the magnitude of (d/dt) of the rated current as shown in the following expression. For a current $i=I_m \sin \omega t$, the threshold limit is given by $$\left|\frac{di}{dt}\right| \approx k\omega I_m \quad (1)$$

where, $I_m$ is the peak magnitude of instantaneous inverter current, k is an arbitrarily selected tolerance constant based on the utility requirements (typically 1.0-1.06) and $\omega$ is the angular frequency of the current.

Meanwhile, the threshold limit of the second rate limiter (255) is set to a very high value such that the second rate limiter can unconditionally replicate the input current signal at its output. As a result, by comparing the signals from the two rate limiters, the comparator acting as 'Slope Detector' (265) can generate a trigger signal at its output if $I_m > I_{m\_rated}$. In other words, when the actual rate of rise of current is more than the permissible rate of rise of current, a trigger signal is generated. Note that, to eliminate potential comparisons with negative signals, absolute value |x| detectors (280) are used with the outputs of both rate limiters.

For the other path, the 'Magnitude Detector' (295) compares the magnitude of the instantaneous current signal with the rated instantaneous peak current magnitude or with the maximum allowable instantaneous peak current magnitude. This maximum allowable instantaneous peak current magnitude is the rated magnitude multiplied by the tolerance constant.

The outputs of the Slope detector (265) and Magnitude Detector (295) are then passed through OR gate (298) and R-S flip-flop (300) to generate the triggering signal 'PVIso'. The PVIso signal thus becomes high when either the rate of rise of current exceeds the acceptable limit or when the instantaneous current magnitude exceeds the rated or maximum allowable current of the inverter.

Referring back to FIG. 3, it is understood from the conventional controller configuration (190) that the inverter transfers power through IGBT switching. Hence, once the triggering signal (320) is generated upon detection of a fault, the triggering signal (320) is used to immediately stop the gating signal of the inverter as shown by the 'DCIso' label in the conventional inverter controller (190) (see right side of box labeled 190). As a result, the PV solar inverter (130) is able to stop the power transfer from the PV modules (170) to the grid (40) within few hundred micro-seconds upon detection of any symmetrical or asymmetrical fault on the network (40). It is noted that once the gating signal is stopped, the DC voltage across the capacitor (140) increases due to the PV module (170) current. According to the current-voltage (I-V) characteristics of the PV module (170), the current output gradually decreases with the increase of voltage at the output of the PV module (170) and, eventually, stops at the rated open circuit voltage of the PV module (170). However, to reduce the DC voltage stress across each IGBT valve or switch, the same triggering signal (320) is used to open a solid state DC breaker and prevent the voltage rise across the DC link capacitor (140) as shown again by the 'DCIso' label in the PV module (170). In addition, this triggering signal (320) is used to isolate the AC filter (180) capacitor by switching off the back to back connected gate turn off (GTO) thyristor, as shown by the 'DCIso' label in the AC filter (180) module. This is done to prevent an undesired ringing effect between the filter capacitors and network inductances. This oscillatory ringing effect mainly arises due to the absence of a sufficient damping resistor in the filter (180) design.

Figure 4:
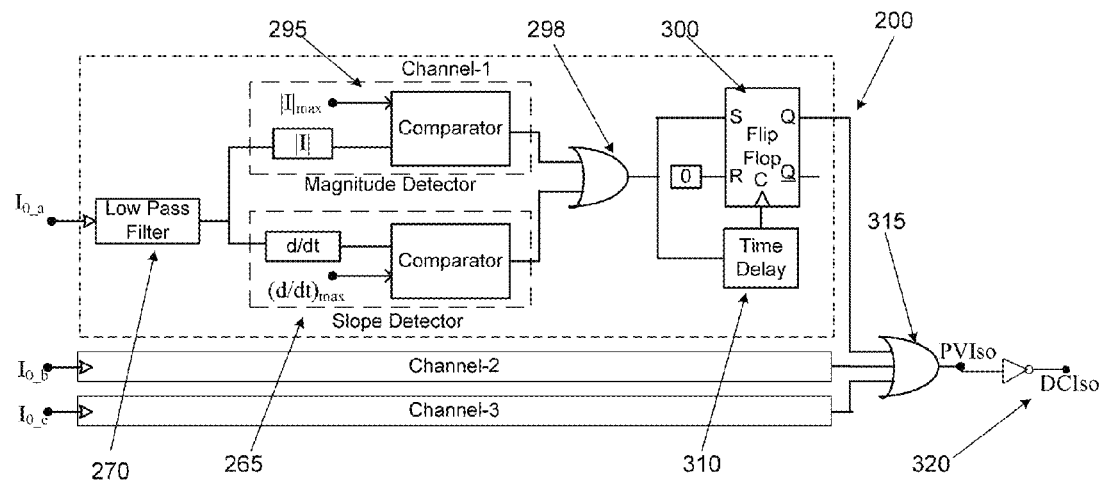
FIGS. 4a-4b show circuit diagrams illustrating the circuitry of a fault detector according to one implementation of the invention.
Figure 4:
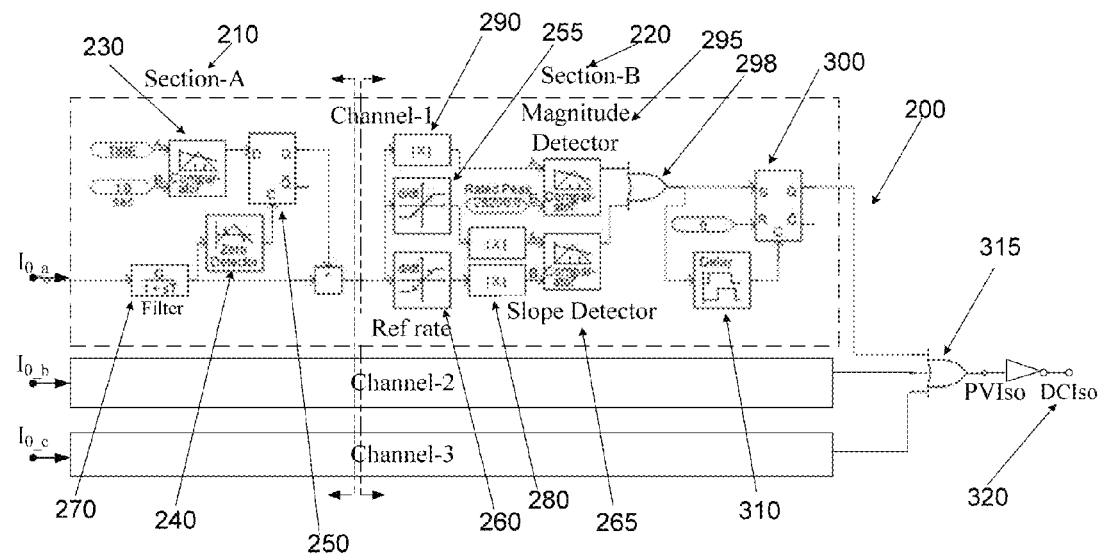
Figure 5:
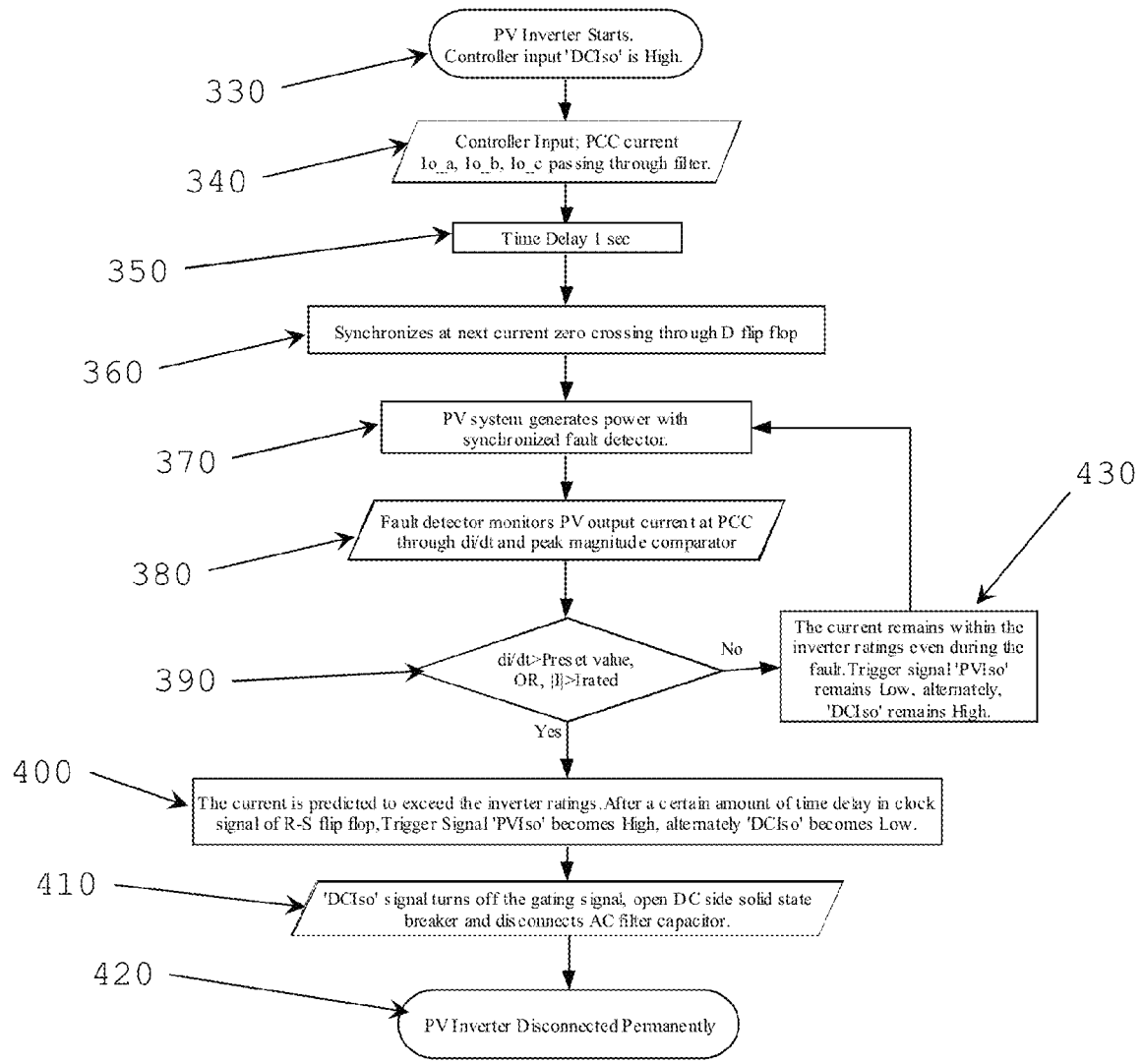
FIG. 5 shows a flowchart detailing the steps in a method according to one aspect of the invention.

The operation of the fault detection and short circuit current management controller and the logic followed by the circuitry illustrated in FIGS. 4 (a) and (b), is illustrated by the flowchart shown in FIG. 5. The process begins as the PV inverter starts (330). The power generation facility is operating in its regular power generation mode, with the controller input signal set as 'DCIso' high, which is the normal operation mode. The fault detector monitors the three phase (a, b, c) instantaneous inverter output currents ($I_{o\_a}$, $I_{o\_b}$, $I_{o\_c}$) at the PCC (340). The input signals of the fault detector are delayed by 1 second to avoid inverter startup transients (350). Once the currents are stabilized, it enters the synchronization process (360). The main synchronization is performed by the zero crossing threshold detectors that trigger the clock signal of the D-type flip-flop at zero crossings of the AC signals. At this point, the power generation facility generates power with a synchronized fault detector (370).

The fault detector continuously monitors the PV output current at the PCC, detecting the onset of faults in the grid (380). The rapid fault detection process is based on the waveshape of the DG inverter current. The rate of rise of current and the peak magnitude of the inverter current are utilized to detect the occurrence of the fault.

The next step in the operation mode is the fault determination (390). This step (390) checks if the rate of rise of the current exceeds a predetermined value or if the peak current magnitude exceeds the rated peak value. If either of these conditions is met, a short circuit is predicted to occur. If the short circuit fault is predicted to occur (400) (i.e. the rate of rise of the current is larger than a preset value or the peak current magnitude is larger than the rated peak value), the output triggering signal, 'PVIso' becomes high and the corresponding 'DCIso' signal becomes low. From the circuit illustrated in the Figures, if the 'DCIso' signal becomes low, it immediately stops the gating signals of the inverter, disconnects the DC link capacitor, and isolates the AC filter capacitor (410). Therefore the PV solar farm or any other inverter based power generation facility disconnects permanently (420) until the fault clears and the system operation is resumed.

If the rate of rise of the current is smaller than a preset value and the peak current magnitude is smaller than the rated peak value, the current remains within the inverter ratings even during short circuit fault events (430). The trigger signal 'PVIso' remains low and the corresponding 'DCIso' signal remains high. Hence, the power generation facility continues to generate power with the synchronized fault detector as desired (370).

Figure 6:
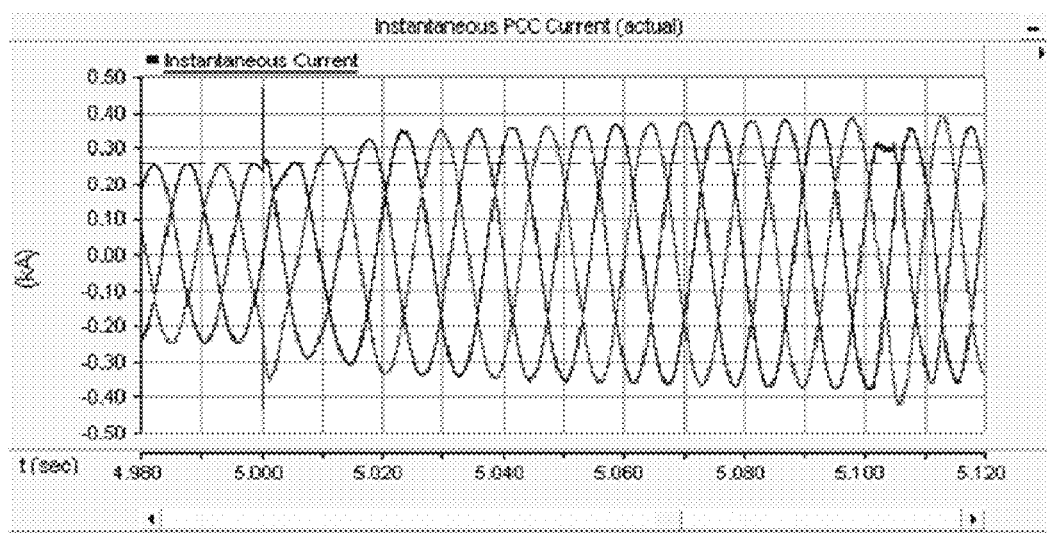
FIGS. 6a-6d show the instantaneous current at point of common coupling (PCC) during short circuit events under differing circumstances.
Figure 6:
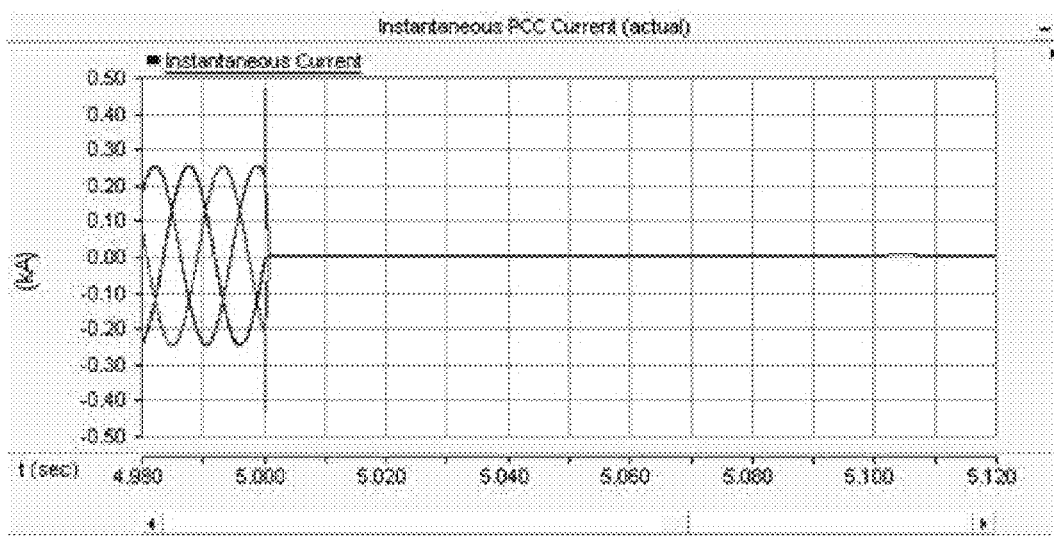
Figure 6:
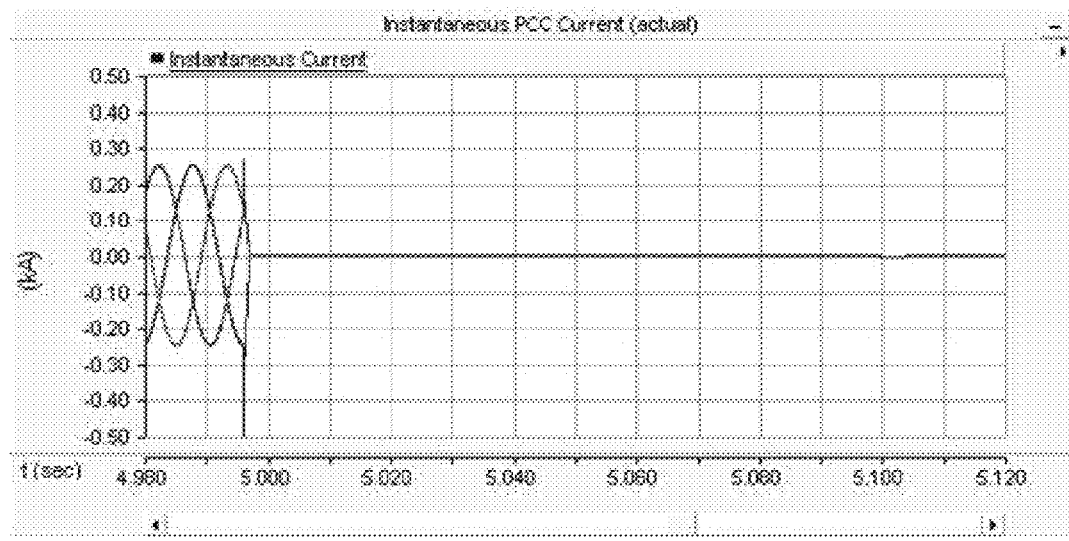
Figure 6:
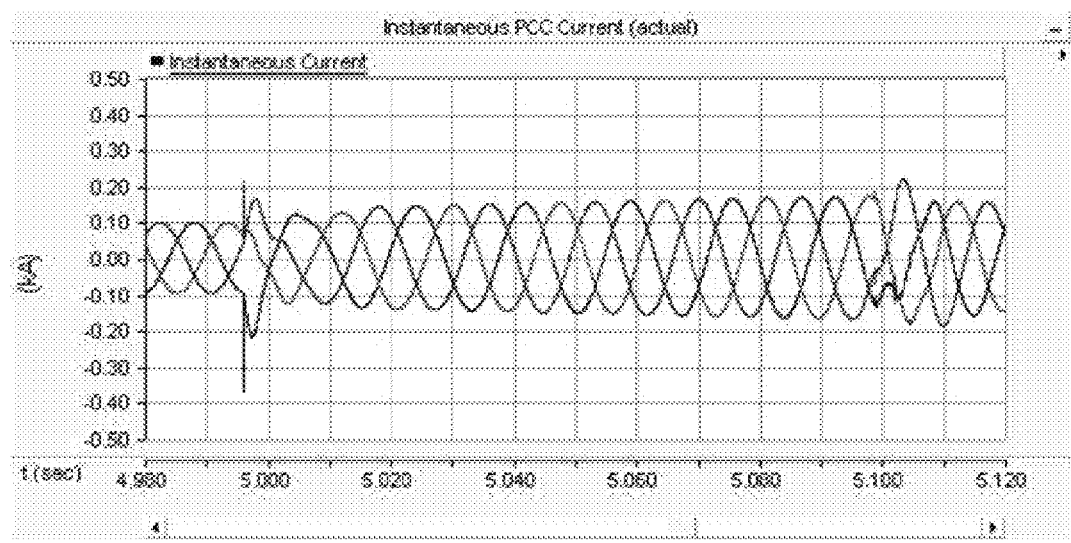
Figure 7:
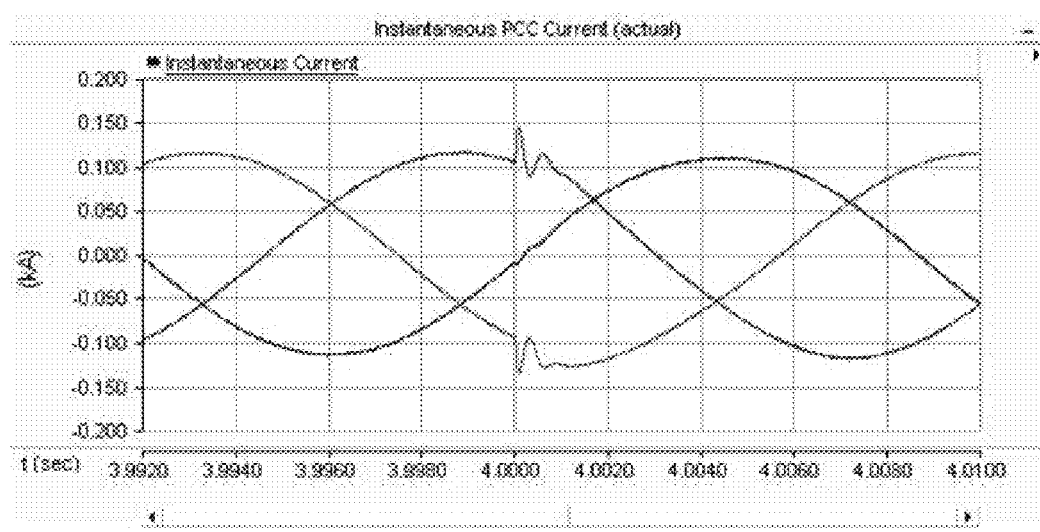
FIG. 7 shows the instantaneous current at point of common coupling (PCC) during load switching event.
Figure 8:
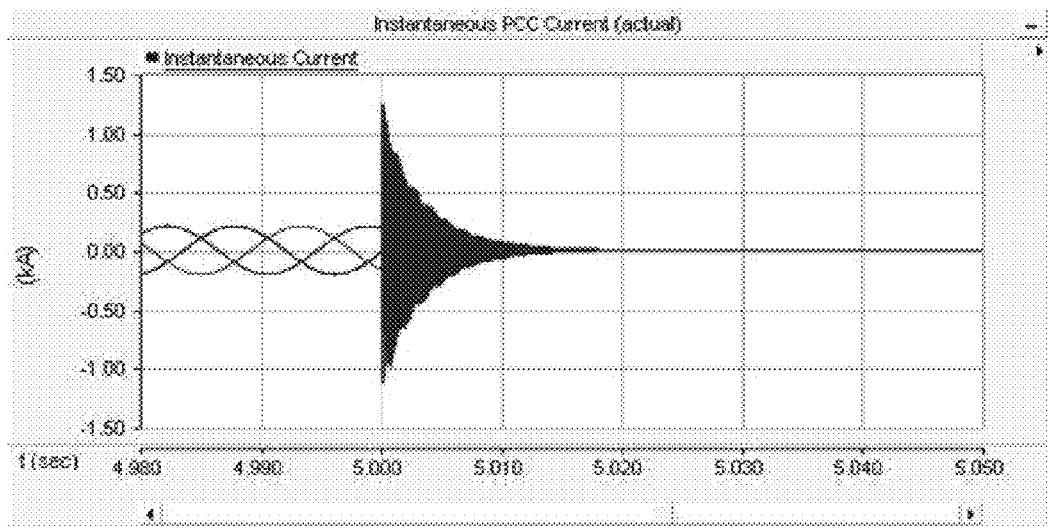
FIG. 8a-8c illustrate the instantaneous current at point of common coupling (PCC) during short circuit events under differing circumstances.
Figure 8:
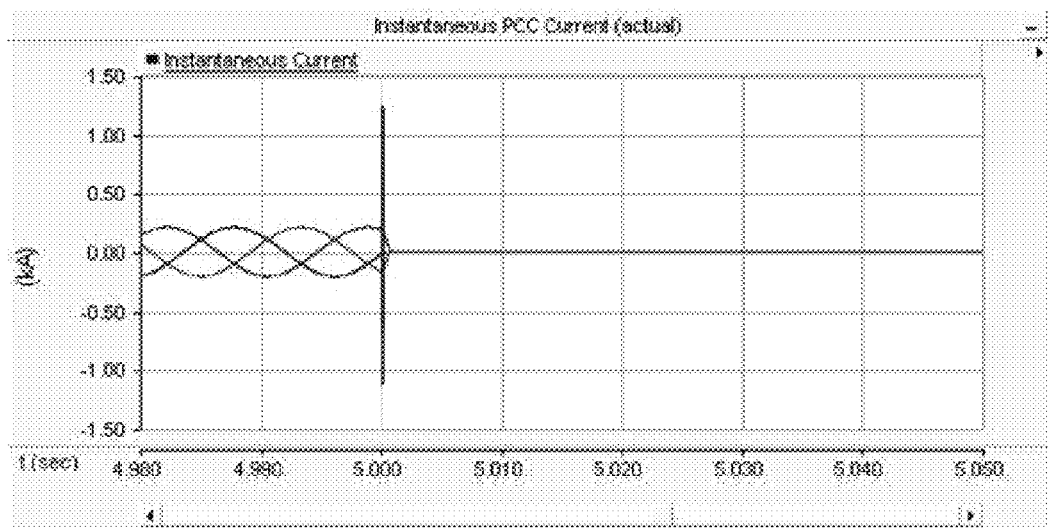
Figure 8:
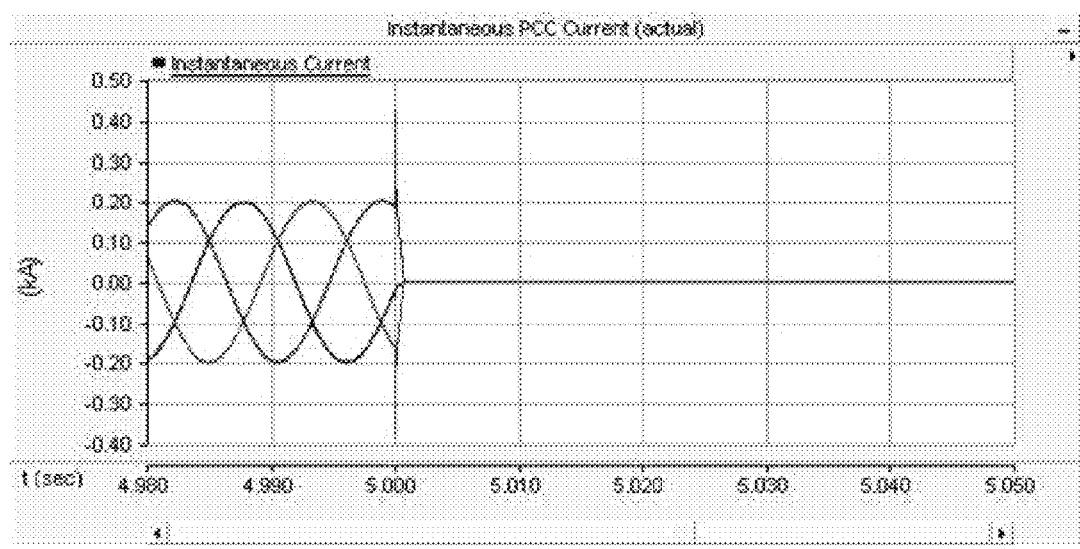

The significant benefits provided by the above embodiment can be further illustrated using the examples in FIGS. 6, 7 and 8. As a demonstration of the robustness of the auxiliary fault detection and short circuit current management controller, several cases of the operational mode is presented below.

FIGS. 6a-6d show the instantaneous current at the point of common coupling (PCC) during short circuit events. As highlighted in FIG. 6 (*a*) if the solar farm is operating at rated power and the fault detector is inactive, the rated current of the inverter is exceeded, resulting in an unacceptably high current for utility companies. The dashed line in FIG. 6a represents the rated current of the inverter, which, in a current example is set at 0.25 kA. With the use of the fault detector the short circuit is sensed immediately and a trip signal is issued. This stops the gating signals of the inverter. The current output from the inverter stops immediately without exceeding the rated peak as shown in FIGS. 6 (*b*) and (*c*), which are for fault occurrence at the current peak and non-peak instants, respectively. It is noted that, while simulating the fault, a high frequency switching spike is observed in EMTDC/PSCAD simulation studies shown in the waveforms of FIGS. 6 (*a*), (*b*) and (*c*). This is due to the mismatch between simulation time step (1 μsec) and the plotting time step (10 μsec). This spike can be eliminated by using the same time step for both simulation and plotting time step. Setting a lower simulation time step gives a precise output but requires a large amount of computer memory to plot at the same time step. This lower simulation time step crashes the simulation most of the time while a higher simulation time step has the lack of accuracy. Therefore, the aforementioned settings are considered as acceptable settings to explain the concept of the fault detector by ignoring the high frequency spike in all the simulation results presented here.

When the fault current contribution remains within the inverter rated limit, the fault detector does not issue any trip signal that eventually allows the solar farm to remain online and deliver current to the grid as demonstrated in FIG. 6 (*d*). It is noted that the fault detector is capable of handling the short circuit current in a timely manner regardless of the type of fault (symmetric or asymmetric) and the location of the fault on the distribution system (nearby or at a remote location).

FIG. 7 shows the instantaneous current at the point of common coupling (PCC) during a load switching event. As highlighted, if load switching current contribution remains within the inverter rated limit, the fault detector does not issue any trip signal regardless of whether the load switching took place nearby or at a remote location. Therefore, the fault detector can distinguish between large load switching current contribution and short circuit fault current contribution.

FIGS. 8a-8c show the instantaneous current at the point of common coupling (PCC) during short circuit events. In one preferred embodiment of the present invention it can be observed that the use of a very small value of a damping resistor in the AC filter creates a ringing effect after the PV solar inverter is disconnected upon the detection of fault. This ringing phenomenon is illustrated in the current waveform in FIG. 8 (*a*). This ringing effect is undesirable as it can be several orders of magnitude larger than the rated current of the inverter. By applying a triggering signal from the fault detector which simultaneously disconnects the PV solar inverter and the AC filter capacitor, the ringing effect is eliminated. The effect of this simultaneous disconnection is shown in the waveform of FIG. 8 (*b*). Alternatively, the ringing effect can be eliminated by the use of a comparatively large damping resistor in the AC filter, the effects of which are shown in FIG. 8 (*c*). In that case, the isolation of filter capacitor from the AC filter is not needed to eliminate the ringing effect.

Figure 9:
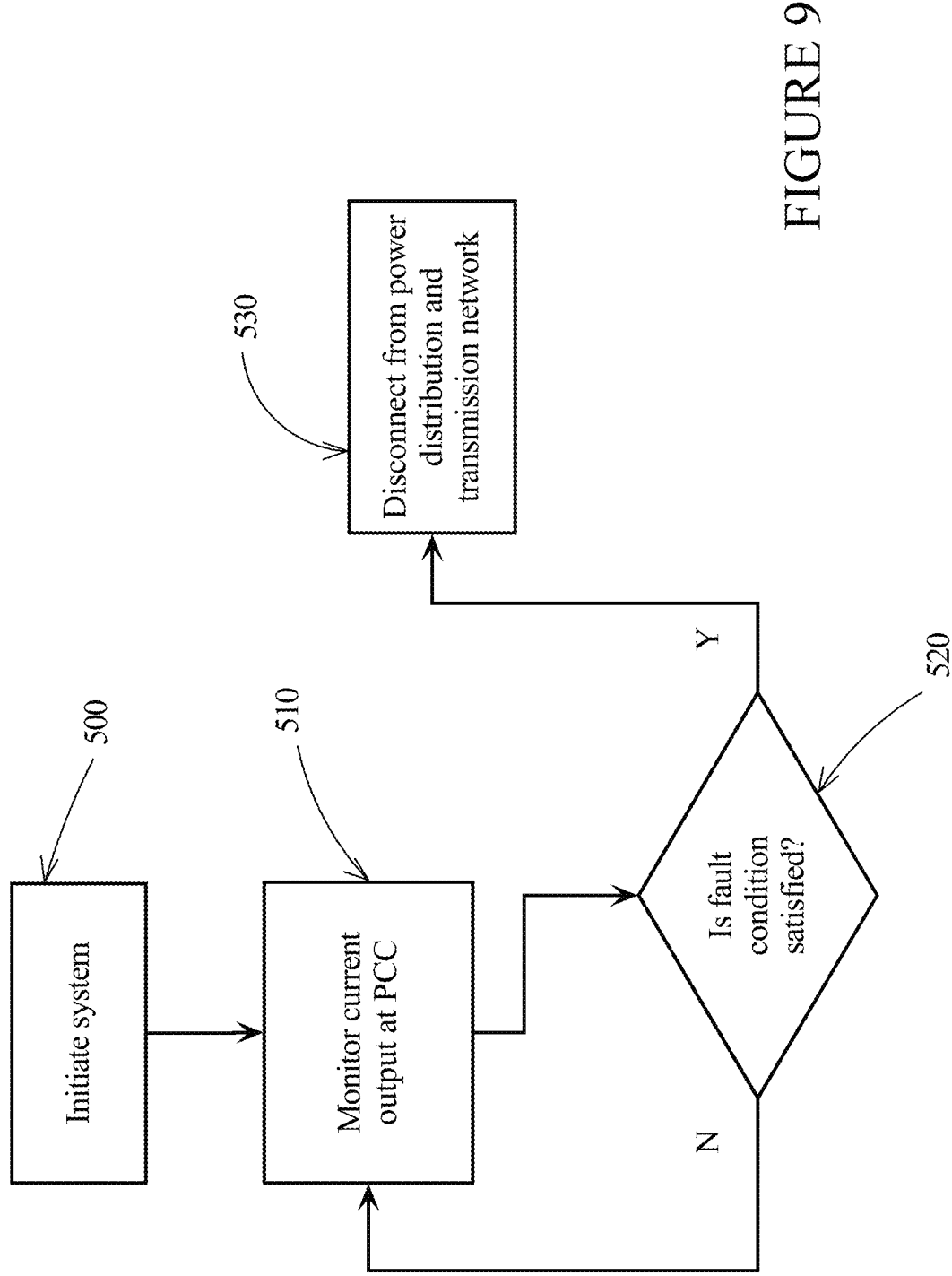
FIG. 9 is a flowchart detailing the steps in a generalized method according to another aspect of the invention.

The process according to one aspect of the invention maybe be viewed more generally as detailed in the flowchart of FIG. 9. The process begins at step 500, that of initiating the system. This step includes synchronizing the fault detector inputs. Step 510 is that of monitoring the DG output current at the PCC. Step 520 is that of checking for a fault condition. The fault condition may be that the rate of rise of the output current is above a predetermined value. Alternatively, the fault condition may be that the peak current magnitude is above the peak rating. Or, as in the fault detector noted above, the fault condition could be either of these conditions. If the fault condition is not satisfied, then the logic returns to step 510. In the event the fault condition is satisfied, the DG is disconnected from the power distribution and transmission network (step 530).

Referring back to FIG. 3, it should be clear that the auxiliary fault detection and short circuit current management controller is not part of the PV solar farm but that existing PV solar farms can be easily retrofitted with such a controller. In fact, the auxiliary fault detector controller detailed above only uses a maximum of three inputs to the PV solar farm to deliver the 'DCIso' trigger signal. Because of this, conventional PV solar farms can be easily retrofitted with the auxiliary fault detector controller. This provides the owners and operators of inverter based power generation facilities with the advantages of the present invention as described above.

It should be also noted that all the proposed embodiments and capabilities of the invention can be achieved for any type of power distribution or power transmission network, be it of radial type or meshed type. The process detailed in FIGS. 5 and 9 may be implemented in hardware using hardwired discrete components as in the embodiment detailed above. Alternatively, the process may be implemented as software which runs on a generalized CPU interfacing with power electronics components.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C") or an object-oriented language (e.g., "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

What is claimed is:

1. A method for determining if a short circuit has occurred on a power distribution and transmission network, the method comprising:
   a) determining a distributed generator output current reading at a point of common coupling where a distributed generator is coupled to said power distribution and transmission network;
   b) determining if at least one fault condition is satisfied based on said current reading;
   c) in the event said at least one fault condition is satisfied, disconnecting said distributed generator from said power distribution and transmission network;
   wherein said method is executed at an inverter based distributed generator facility; and
   wherein said at least one fault condition is selected from a group comprising:
      a peak current magnitude being higher than a predetermined safe peak value, said peak current magnitude being a magnitude for a highest reading for said current reading and said predetermined safe peak value being a current value which is safe for said network; and
      a rate of increase of said current value being greater than a predetermined safe rate of change value, said predetermined safe rate of change value being a value considered safe for said network.

2. A method according to claim 1 wherein said distributed generator facility is a solar farm.

3. A method according to claim 1 wherein said distributed generator facility is a wind farm.

4. A method according to claim 1 wherein step c) comprises simultaneously disconnecting an inverter, a power source and an AC filter capacitor from said power distribution and transmission network.

5. A method according to claim 1 wherein multiple distributed generator output current readings are taken and each current reading is used to determine if said at least one fault condition is satisfied.

6. A method according to claim 5 wherein said multiple distributed generator output current readings are synchronized.

7. Computer readable media having encoded thereon computer executable instructions which, when executed, implements a method for determining if a short circuit has occurred on a power distribution and transmission network, the method comprising:
   a) determining a distributed generator output current reading at a point of common coupling where a distributed generator is coupled to said power distribution and transmission network;
   b) determining if at least one fault condition is satisfied based on said current reading;
   c) in the event said at least one fault condition is satisfied, disconnecting said distributed generator from said power distribution and transmission network; and
   wherein said at least one fault condition is one of:
      a peak current magnitude being higher than a predetermined safe peak value, said peak current magnitude being a magnitude for a highest reading for said current reading and said predetermined safe peak value being a current value which is safe for said network; and
      a rate of increase of said current value being greater than a predetermined safe rate of change value, said predetermined safe rate of change value being a value considered safe for said network.

* * * * *